(12) United States Patent
Shin et al.

(10) Patent No.: US 12,544,032 B2
(45) Date of Patent: Feb. 10, 2026

(54) RADIOGRAPHIC DEVICE AND RADIOGRAPHIC METHOD USING SAME

(71) Applicant: DRTECH CORPORATION, Seongnam-si (KR)

(72) Inventors: Choul Woo Shin, Seongnam-si (KR); Chang Gyu Lee, Yongin-si (KR); Jong Woo Kim, Yongin-si (KR); Cheon Kyung Sung, Uijeongbu-si (KR); Jeon Min Kang, Seongnam-si (KR)

(73) Assignee: DRTECH CORPORATION, Seongnam-si (KR)

( * ) Notice: Subject to any disclaimer, the term of this patent is extended or adjusted under 35 U.S.C. 154(b) by 401 days.

(21) Appl. No.: 18/269,314

(22) PCT Filed: Dec. 24, 2021

(86) PCT No.: PCT/KR2021/019891
§ 371 (c)(1),
(2) Date: Jun. 23, 2023

(87) PCT Pub. No.: WO2022/139560
PCT Pub. Date: Jun. 30, 2022

(65) Prior Publication Data
US 2024/0050059 A1 Feb. 15, 2024

(30) Foreign Application Priority Data

Dec. 24, 2020 (KR) .......................... 10-2020-0183467
Dec. 23, 2021 (KR) .......................... 10-2021-0186483

(51) Int. Cl.
*A61B 6/00* (2024.01)
(52) U.S. Cl.
CPC ............ *A61B 6/547* (2013.01); *A61B 6/4441* (2013.01); *A61B 6/542* (2013.01)

(58) Field of Classification Search
CPC ....... A61B 6/4441; A61B 6/542; A61B 6/545; A61B 6/547
See application file for complete search history.

(56) References Cited

U.S. PATENT DOCUMENTS

| 8,315,355 B2 | 11/2012 | Mohamed |
| 2010/0232573 A1 | 9/2010 | Ozawa et al. |

(Continued)

FOREIGN PATENT DOCUMENTS

| CN | 105025791 A | 11/2015 |
| JP | H09108209 A | 4/1997 |

(Continued)

OTHER PUBLICATIONS

Office Action of KR Patent Application No. 10-2021-0186483 dated Nov. 2, 2023.

(Continued)

*Primary Examiner* — Dani Fox
(74) *Attorney, Agent, or Firm* — Dinsmore & Shohl LLP; Yongsok Choi, Esq.

(57) ABSTRACT

A radiographic device includes a radiation irradiator; an image acquisition unit; a support member; a driving unit driving the support member; a position information detector which detects location information indicating the location of one or more of the radiation irradiator and the image acquisition unit; a storage unit which links reference location information, indicating the location of one or more of the radiation irradiator and the image acquisition unit, with corresponding radiation output information of the radiation irradiator, and stores same as positioning information; and a determination controller which, if the location information detected by the position information detector matches with the reference location information of the positioning information, controls the radiation irradiator so that the radiation (Continued)

irradiator emits radiation according to the radiation output information of the corresponding positioning information.

15 Claims, 4 Drawing Sheets

(56) References Cited

U.S. PATENT DOCUMENTS

| | | |
|---|---|---|
| 2012/0087469 A1 | 4/2012 | Masuo |
| 2013/0243160 A1 | 9/2013 | Graumann |
| 2014/0247918 A1 | 9/2014 | Kang |
| 2015/0374325 A1 | 12/2015 | Shimizu |
| 2016/0082596 A1* | 3/2016 | Barth ............... A61B 6/548 901/1 |

FOREIGN PATENT DOCUMENTS

| | | |
|---|---|---|
| JP | 2001-076040 A | 10/2001 |
| JP | 2001276040 A | 10/2001 |
| JP | 2001292984 A | 10/2001 |
| JP | 2008-200327 A | 9/2008 |
| JP | 2010046555 A | 3/2010 |
| JP | 2014168571 A | 9/2014 |
| JP | 6549561 B2 | 7/2019 |
| KR | 101501086 B1 | 3/2015 |
| WO | 2007091295 A1 | 8/2007 |
| WO | 2014136669 A1 | 9/2014 |

OTHER PUBLICATIONS

Extended European Search Report for EP21911625.8 dated Oct. 28, 2024.

Navab, Nassir et al., "Visual Servoing for Intraoperative Positioning and Repositioning of Mobile C-arms", MICCAI—International Conference on Medical Image Computing and Computer-Assisted Intervention vol. 9, No. 1, pp. 551-560, Oct. 1, 2006.

De Silva, Tharindu et al., "Virtual fluoroscopy for intraoperative C-arrn positioning and radiation dose reduction", Journal of Medical Imaging, vol. 5, No. 1, pp. 1-8, Feb. 13, 2018.

* cited by examiner

RADIOGRAPHIC DEVICE AND RADIOGRAPHIC METHOD USING SAME

CROSS-REFERENCE TO RELATED APPLICATIONS

This application is a national phase of International Application No. PCT/KR2021/019891 filed on Dec. 24, 2021, which claims priority to Korean Patent Application No. 10-2020-0183467 filed on Dec. 24, 2020 and Korean Patent Application No. 10-2021-0186483 filed on Dec. 23, 2021, the entire contents of which are herein incorporated by reference.

TECHNICAL FIELD

The present invention relates to a radiographic device and a radiographic method using the same.

BACKGROUND ART

Radiographic devices using radiation such as X-rays are imaging devices that radiate radiation onto an affected part of a human or animal body and receive penetrating radiation to acquire an image of the affected part. Such radiographic devices are devices that continuously or consecutively provide radiographic images of an affected part and are widely used for diagnosing or reading of the affected part and various medical procedures.

Since a radiographic device radiates radiation such as X-rays onto a subject, it is important to control a radiation dose applied to the subject. In particular, since a C arm type radiographic device performs X-ray imaging for a relatively long time, it is necessary to minimize an X-ray dose. In addition, recently, a need for precise high-resolution and real-time images for accurate diagnosis and treatment has increased considerably, and in order to improve the quality of a radiographic image, an increase in radiation dose is also necessary.

A radiographic device needs to acquire images from various positions and angles in order to acquire the most suitable image for the diagnosis of a subject. In particular, in many cases, it is necessary to repeatedly image the same position to reconfirm an affected part. In general, in order to acquire an optimal image, a user adjusts a rotation angle of a C arm through a repetitive trial and error method, determines a final rotation angle, and performs imaging. In such a process, a subject and a user are exposed to radiation for a long time.

There is a radiographic device which stores position information at the time of previous radiography to accurately reposition a position of a radiation source and a radiation detector, which are disposed opposite to each other with an affected part interposed therebetween, to a position at which the previous radiography was performed in order to re-image the same position. The radiation source and the radiation detector can be relocated to a desired exact position using the stored position information.

However, in conventional radiographic devices in which a radiation source and a radiation detector are repositioned using such position information, in order to perform radiography at a repositioned imaging position, an imaging process using set imaging parameters and automatic brightness exposure control according to the imaging process should be performed. As a result, there is a problem that unnecessary radiation exposure is induced in patients and users due to an automatic brightness exposure time.

RELATED ART DOCUMENTS

Patent Documents (Patent Document 1) Korean Patent Registration No. 10-1501086 (Mar. 4, 2015)
(Patent Document 2) Japanese Patent Registration JP6549561B (Jul. 5, 2019)
(Patent Document 3) U.S. Pat. No. 8,315,355B (Nov. 20, 2012)

DISCLOSURE

Technical Problem

The present invention is directed to providing a method of reducing a radiation exposure dose generated during automatic brightness control when repetitive radiography is performed at the same position.

Technical Solution

According to an embodiment of the present invention, a radiographic device incudes a radiation irradiator configured to radiate radiation, an image acquisition unit configured to acquire an image by receiving the radiation which is radiated from the radiation irradiator and passes through an irradiation target object, a support member configured to support the radiation irradiator and the image acquisition unit, a driving unit configured to drive the support member, a position information detector configured to detect position information indicating a position of at least one of the radiation irradiator and the image acquisition unit, a storage unit configured to associate reference position information indicating the position of the at least one of the radiation irradiator and the image acquisition unit and corresponding radiation output information of the radiation irradiator and store the associated information as positioning information, and a determination controller configured to, when the position information detected by the position information detector matches the reference position information of the positioning information, control the radiation irradiator to operate and radiate radiation according to the radiation output information of the corresponding positioning information.

The reference position information may correspond to a position at which radiography is performed by the radiation irradiator and the image acquisition unit, and the radiation output information may include a radiation output condition for driving the radiation irradiator to perform the radiography performed at the position of the reference position information.

The positioning information may include a plurality of pieces of positioning information corresponding to a plurality of positions. The respective positioning information may include reference position information indicating different positions and radiation output information for radiography at a corresponding position. For example, the plurality of pieces of positioning information may be selected by a user in a process of performing radiography.

The radiographic device may further include a display unit configured to display the positioning information, and the display unit may be configured to display both of the reference position information and the position information detected by the position information detector. Since the reference position information and the detected position information are displayed together on the display unit, the user can visually confirm whether a current position matches a reference position so that the convenience of manipulation can be improved.

The reference position information and the position information detected by the position information detector may include information indicating a position of the driving unit.

The support member may be a C arm having both end portions on which the radiation irradiator and the image acquisition unit are fixed, and the driving unit may be configured to drive the C arm to perform linear movement in one or more directions and rotational movement in one or more directions.

The radiation irradiator may be an X-ray irradiator configured to radiate X-rays, and the radiation output information may include at least one of an output voltage, an output current, X-ray power, an irradiation distance, an irradiation time, a focal size, a rotation time, and a loading time for driving the X-ray irradiator. The radiation output information may be an X-ray parameter for driving the X-ray irradiator to radiate desired X-rays.

The positioning information may further include a radiographic image acquired at a position of the reference position information. Since the positioning information includes the radiographic image acquired at the corresponding position, more information including image information may be provided to the user.

The positioning information may further include at least one of direction information of an X-ray image, position information of a collimator of the X-ray irradiator, and image processing information.

According to another embodiment of the present invention, a radiographic device includes an X-ray irradiator configured to radiate X-rays, an image acquisition unit configured to acquire an image by receiving the X-rays which are radiated from the radiation irradiator and pass through an irradiation target object, a C arm configured to support the X-ray irradiator and the image acquisition unit, a driving unit configured to drive the C arm, a position information detector configured to detect position information of at least one of driving elements of the driving unit of the C arm, a storage unit configured to set position information in which an image is captured by the X-ray irradiator and the image acquisition unit as reference position information, associate the reference position information and X-ray output information in which the image is captured, and store the associated information as positioning information, and a determination controller configured to control an operation of the X-ray radiator based on the position information detected by the position information detector. The determination controller may be configured to perform an operation of associating the X-ray output information for driving the X-ray irradiator to capture the image when the image is captured by the X-ray irradiator and the image acquisition unit and the reference position information indicating a position at which the image is captured and storing the associated information as the positioning information, and an operation of, when the position information of the driving element detected by the position information detector matches any one piece of reference position information of the positioning information, controlling the X-ray irradiator to be driven under an X-ray output condition according to the X-ray output information associated with the reference position information so that the image is captured. The determination controller may include a processor, a memory, and related hardware and software and may be provided to be driven by a program programmed to perform the operations.

The positioning information may further include an X-ray image acquired with the reference position information and the X-ray output information associated therewith.

The radiographic device may further include a display unit configured to display information, and the display unit may be configured to display both of the reference position information and the position information detected by the position information detector.

The display unit may include a reference position information display area in which the reference position information is displayed, a detection position information display area in which the position information detected by the position information detector is displayed, and a reference position information storage area through which a command for storing the detected position information as the reference position information is received.

The display unit may be configured to identifiably display a value matching a position value of the reference position information among position values of the detected position information.

According to still another embodiment of the present invention, a radiographic method, which is performed using a radiographic device including a radiation irradiator configured to radiate radiation, and an image acquisition unit configured to acquire an image by receiving the radiation which is radiated from the radiation irradiator and penetrates an irradiation target object, includes associating reference position information indicating a position of the radiation irradiator during radiography and radiation output information including a driving condition of the radiation irradiator with each other to store the associated information in a storage unit as positioning information, determining whether position information indicating a position of the radiation irradiator detected in real time matches any one piece of reference position information in the positioning information stored in the storage unit, and when the detected position information matches the reference position information in the positioning information, controlling the radiation irradiator to be driven according to the radiation output information associated with the reference position information so that an image is captured.

The positioning information may further include a radiographic image captured according to the radiation output information at a reference position.

The radiographic method may further include displaying both of the reference position information and the detected position information of the positioning information on a display unit.

Advantageous Effects

According to the present invention, a position of previously performed radiography is set as reference position information, radiation output information is stored as positioning information in association therewith, and when position information detected in real time matches the reference position information of the positioning information, the corresponding radiation output information is used to output radiation, thereby reducing a time taken for automatic brightness adjustment to reduce a radiation exposure dose applied to patients and users.

MODES OF THE INVENTION

Hereinafter, embodiments of the present invention will be described in detail with reference to the accompanying drawings so that those skilled in the art may easily practice the present invention. However, the present invention may be embodied in various different forms and is not limited to the embodiments to be described hereafter.

Figure 1:
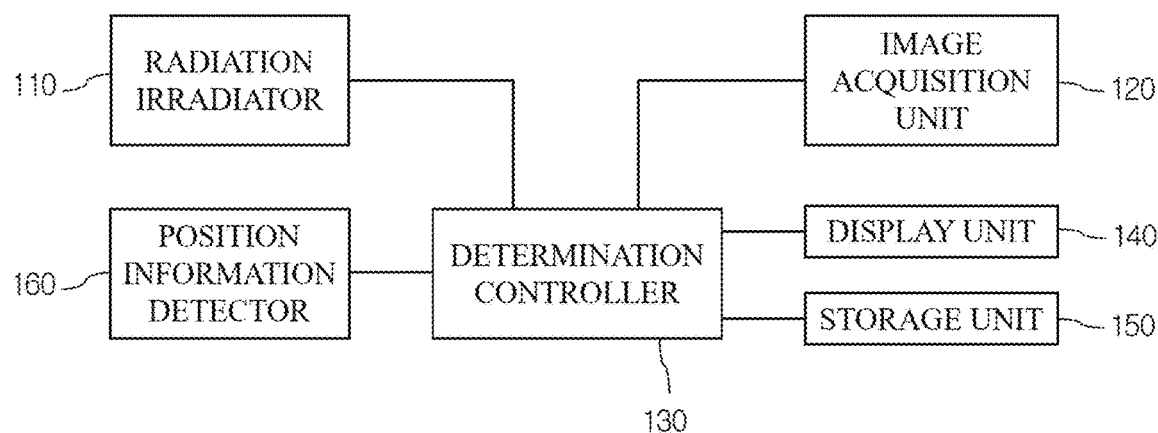
FIG. 1 is a schematic block diagram of a radiographic device according to an embodiment of the present invention.
Figure 2:
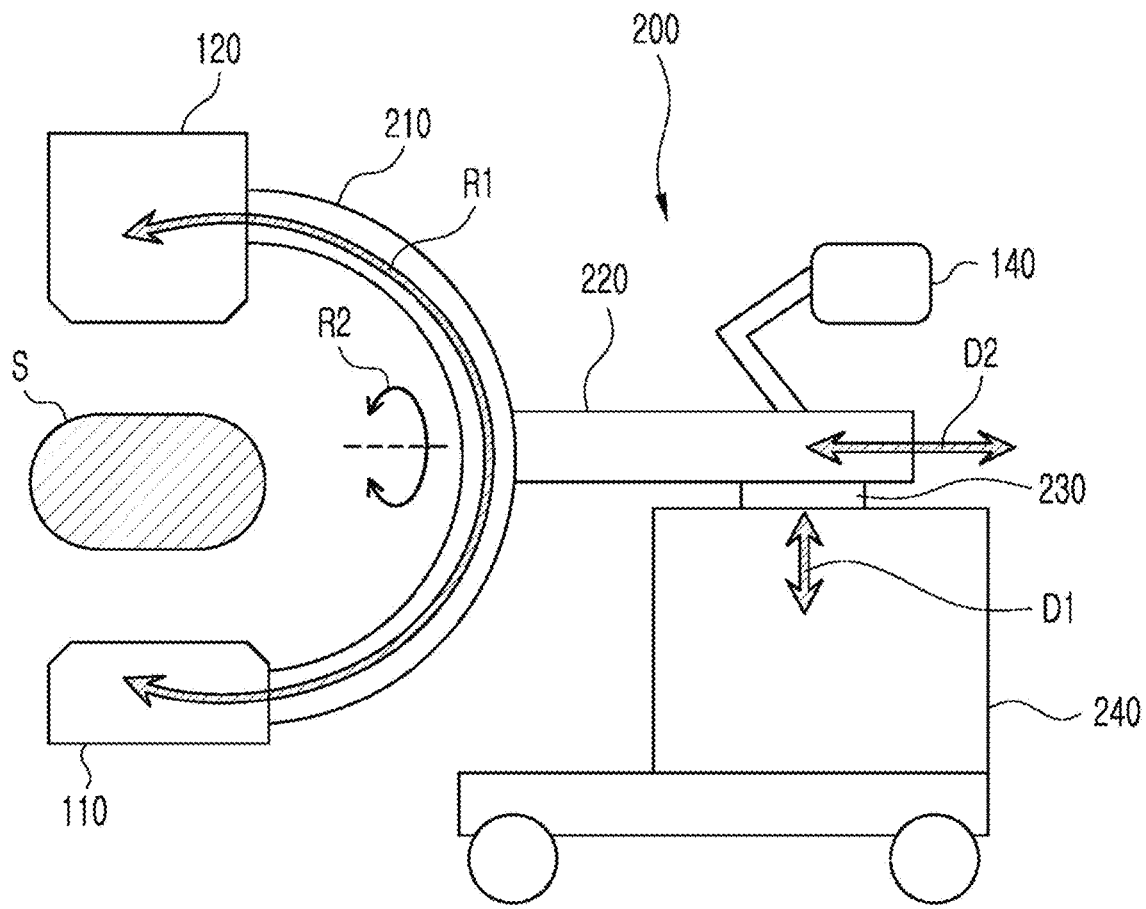
FIG. 2 is a schematic diagram illustrating the radiographic device according to an embodiment of the present invention.

According to an embodiment of the present invention, referring to FIGS. 1 and 2, a radiation irradiator 110 and an image acquisition unit 120 are supported by a support structure 200. The radiation irradiator 110 outputs radiation and is arranged such that the output radiation is radiated onto an irradiation target object S during imaging. The image acquisition unit 120 acquires image data by receiving radiation that is output from the radiation irradiator 110 and passes through the irradiation target object S. The radiation irradiator 110 may be an X-ray generator including an X-ray source that outputs X-rays, and the image acquisition unit 120 may include a device that is arranged opposite to the X-ray generator and receives X-rays penetrating the irradiation target object S to convert the received X-rays into image data in the form of visible light.

The radiographic device of the present invention may be applied to a mobile C arm X-ray imaging device, an interventional X-ray device, an interventional angiography C arm X-ray device, and the like.

The support structure 200 is configured to support the radiation irradiator 110 and the image acquisition unit 120 and change a spatial position and a rotational position of the radiation irradiator 110 and the image acquisition unit 120 in order to change an imaging position, angle, and the like of the irradiation target object S. For example, the support structure 200 may include a support body 240, a lift column 230 coupled to the support body 240 to be movable in a vertical direction D1, and a back and forth movement arm 220 coupled to the lift column 230 to be movable in the vertical direction together with the lift column 230 and be relatively movable in a horizontal direction D2 perpendicular to the lift column 230.

A support member, for example, a C arm 210, is fastened to the back and forth movement arm 220 to be relatively rotatable with respect to the back and forth movement arm 220 in at least one rotation direction, and the radiation irradiator 110 and the image acquisition unit 120 are fastened to both ends of the C arm 210. In this case, the C arm 210 may be fastened to the back and forth movement arm 220 to be movable up or down in the vertical direction and movable forward or backward in the horizontal direction together with the back and forth movement arm 220 and be relatively rotatable with respect to the back and forth movement arm 220 in at least one rotation direction, for example, at least one rotation direction of an orbital rotation direction R1 and an axial rotation direction R2 centered on a direction parallel to a horizontal movement direction of the back and forth movement arm 220. Although not shown in the drawings, the support structure 200 may include actuators such as motors for the vertical movement of the lift column 230, the horizontal movement of the back and forth movement arm 220, and the rotation of the C arm 210. Elements for supporting and driving the C arm 210 which is a support member for supporting the radiation irradiator 110 and the image acquisition unit 120, that is, the back and forth movement arm 220, the lift column 230, and the actuators provided therein, may be referred to as driving elements for driving the C arm 210, and a combination thereof may be referred to as a driving unit for driving the C arm 210. Also, in another embodiment of the present invention, the C arm 210 may be configured to perform panning rotation through the transverse rotation of the back and forth movement arm 220. A shape of the support member is not limited to a C-shape, and in other embodiments of the present invention, instead of the C-shape, a U-shape or G-shape arm may be used as the support member.

A position information detector 160 measures and acquires position information of the radiation irradiator 110 or the image acquisition unit 120. Here, the position information should be interpreted as including spatial position information indicating a spatial coordinate position and various pieces of posture position information such as a rotation angle. Since the radiation irradiator 110 and the image acquisition unit 120 are fixedly fastened to the C arm 210, the position information of the radiation irradiator 110 and the image acquisition unit 120 may correspond to position information of the C arm 210. That is, the position information of the C arm 210 and the position information of each of the radiation irradiator 110 and the image acquisition unit 120 may be mutually obtained through a mathematical calculation according to a geometrical position relationship therebetween. For this reason, it may be understood that the position information of the C arm 210 and the position information of each of the radiation irradiator 110 and the image acquisition unit 120 may be mutually obtained throughout the description and claims of the present application. In the present specification, an example of a case in which position information of the driving element of the driving unit for driving the C arm 210 is detected, and an imaging method is performed based on the detected position information will be described.

The position information detector 160 may be configured to acquire position information of the C arm 210, to which the radiation irradiator 110 and the image acquisition unit 120 are fixedly fastened, in real time. The position information detector 160 may include one or more sensors for measuring the position information of the C arm 210, for example, a rotation angle sensor for measuring a rotation angle of the C arm 210 in the orbital rotation direction R1, a rotation angle sensor for measuring a rotation angle of the C arm 210 in the axial rotation direction R2, a horizontal displacement sensor for measuring position movement displacement of the C arm 210 in the horizontal direction D2, and a vertical displacement sensor for measuring position movement displacement of the C arm 210 in the vertical direction D1. Here, horizontal displacement, vertical displacement, and a rotation angle of the C arm 210 may be values corresponding to relative displacement with respect to a preset reference value, and based on the position information of the C arm 210, it is possible to understand an arrangement state of the C arm 210 and the radiation irradiator 110 and image acquisition unit 120 fixed thereto with respect to the irradiation target object S.

Figure 3:
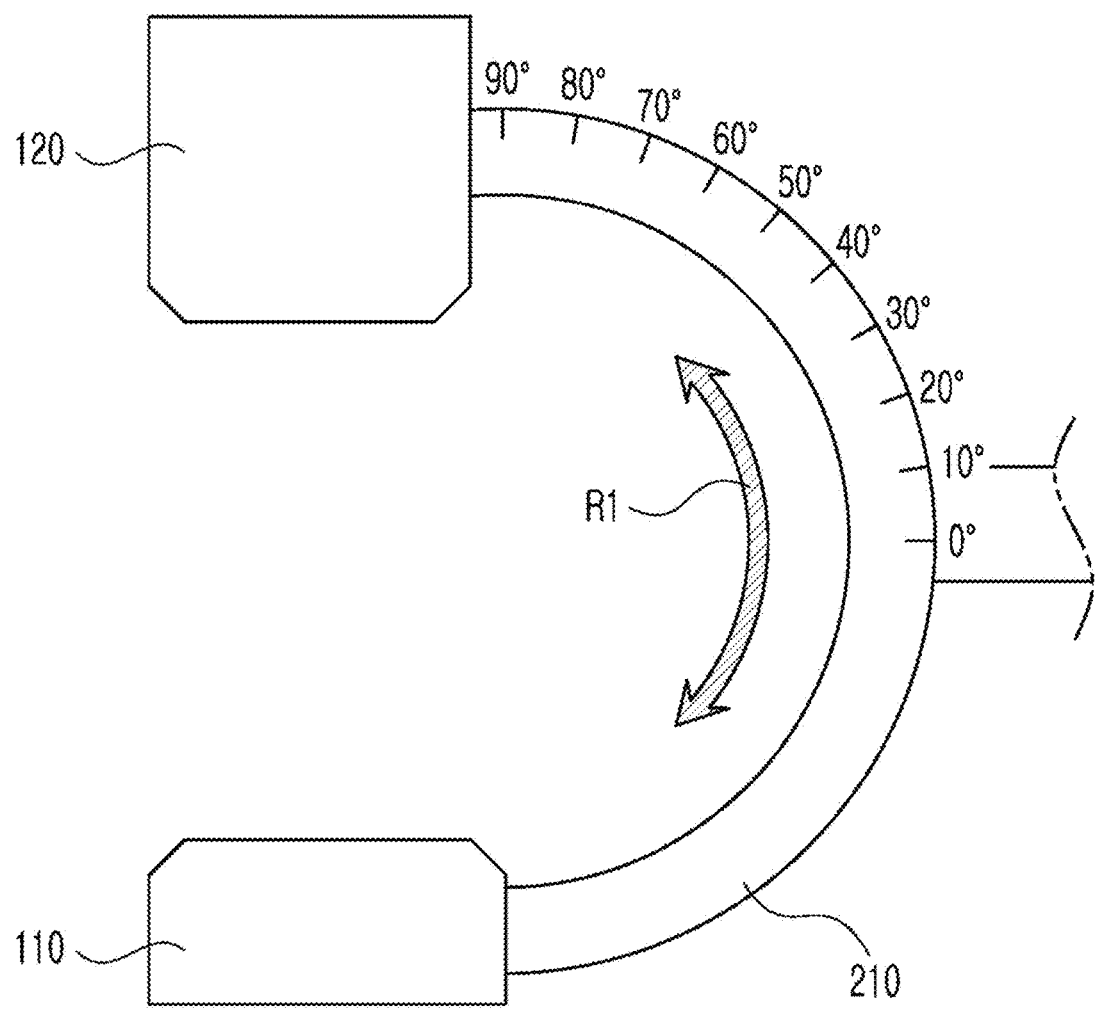
FIG. 3 is a schematic diagram illustrating a C arm of the radiographic device according to an embodiment of the present invention.

For example, the rotation angle sensor for measuring the rotation angle in the orbital rotation direction R1 may include a non-contact encoder mounted on the C arm 210 and may calculate a rotation angle by converting a distance of the encoder into an angle. FIG. 3 is a schematic view illustrating the C arm 210 of the radiographic device according to the embodiment of the present invention, and for convenience of understanding and description, an angle scale for finding a rotation angle of the C arm 210 is marked on the C arm 210. The rotation angle sensor for measuring the rotation angle in the orbital rotation direction R1 may measure a rotation angle of the C arm 210. The rotation angle sensor for measuring the rotation angle of the C arm 210 in the axial rotation direction R2 may include a gear encoder installed on the back and forth movement arm 220 and may measure a rotation angle of the C arm 210 about a longitudinal axis of the back and forth movement arm 220 using a signal of the gear encoder. The horizontal displacement sensor for measuring the position movement displacement of the C arm 210 in the horizontal direction may include a linear encoder for detecting displacement of the back and forth movement arm 220 in the horizontal direction D2 and may measure the position movement displacement of the back and forth movement arm 220, that is, the position movement displacement of the C arm 210 in the horizontal direction D2, through the linear encoder. The vertical displacement sensor for measuring the position movement displacement of the C arm 210 in the vertical direction D1 may include a linear encoder for detecting displacement of the lift column 230 in the vertical direction D1 and may measure the position movement displacement of the lift column 230, that is, the position movement displacement of the C arm 210 in the vertical direction D1, through the linear encoder.

The position information of the C arm 210 may include information calculated by the sensors, that is, a rotation angle in the orbital rotation direction R1, a rotation angle in the axial rotation direction R2, displacement in the horizontal direction, and displacement in the vertical direction.

A storage unit 150 stores image data, and a radiation output condition and reference position information associated with each other in relation to the image data. The reference position information is information about a position at which imaging is performed by means of radiation output, and the radiation output condition is a driving condition for outputting radiation for radiation imaging at a corresponding position. When radiation is, for example, X-rays, the radiation output condition may include an X-ray output voltage and output current. In addition, when the storage unit 150 stores an image captured at an arbitrary position, the storage unit 150 may combine X-ray output information, which is used for capturing an image at a corresponding position, that is, X-ray exposure parameters (Kv, mA, and the like) and data about an rotation angle, a movement distance, and the like which is movement data of the driving elements for driving the C arm 210, with a corresponding image to store the X-ray output information. The storage unit 150 may be a memory device capable of storing information.

A determination controller 130 is configured to set a radiation output condition of the radiation irradiator 110. Specifically, the determination controller 130 is configured to set a radiation output condition of the radiation irradiator 110 according to reference position information stored in the storage unit 150 and radiation output information associated therewith. In this case, one or more pieces of reference position information and one or more pieces of radiation output information associated therewith may be stored in the storage unit 150, and when position information measured by the position information detector 160 matches any one of the pieces of reference position information stored in the storage unit 150, the determination controller 130 may set a radiation output condition using radiation output information associated with a corresponding reference position. The determination controller 130 may include a processor, a memory, and related hardware and software, and the processor may be configured to execute commands for implementing functions and methods to be described below.

The determination controller 130 and the storage unit 150 may be installed on the support body 240 or may be provided in a separate workstation. The storage unit 150 may be implemented as a separate server or a cloud server wiredly or wirelessly connected to the determination controller 130.

The radiation irradiator 110 is electrically connected to the determination controller 130 to receive a signal about a radiation output condition from the determination controller 130 and output radiation, that is, X-rays, according to the radiation output condition received from the determination controller 130.

When position information acquired by the position information detector 160 matches any one of the pieces of reference position information stored in the storage unit 150, the determination controller 130 sets a radiation output condition of the radiation irradiator 110 according to radiation output information associated with corresponding reference position information. Here, the reference position information is position information that is measured when image data is acquired and is stored in association with the image data. The reference position information becomes a comparison criterion for determining whether the radiation irradiator 110 and the image acquisition unit 120 are repositioned at the same position through comparison with position information to be measured later.

When image data is acquired through imaging, the determination controller 130 may associate position information at the time of the corresponding imaging with the image data and store the position information. In addition, when image data is acquired, radiation output information including a radiation output condition under which radiation is output from the radiation irradiator 110 may be associated with the corresponding image data and stored in the storage unit 150. The position information associated with the image data and stored in this way becomes reference position information.

Image data in which position information and a radiation output condition associated with each other are combined is stored in the storage unit 150. The determination controller 130 stores various types of information in the storage unit 150 and performs control such that the stored information is read. The image data in which the position information and the radiation output condition associated with each other are combined is information for storing a radiation output condition of radiography performed at an arbitrary position, and in this sense, such image data is referred to as positioning image data throughout the present specification.

The determination controller 130 mutually associates image data with radiation output information and position information related to the image data and stores the image data, the radiation output data, and the position information in the storage unit 150. The position information associated with the image data by the determination controller 130 is stored as reference position information related to the associated image data.

The determination controller 130 may associate position information with image data according to a user selection and store the position information in the storage unit 150, and may exclude radiation output information. That is, if necessary, only the image data and the reference position information may be associated with each other and stored, excluding the radiation output information.

A display unit 140 is configured to display at least one of real-time position information, image data, reference position information, and radiation output information. The display unit 140 may be any device capable of displaying information and images. The display unit 140 may be, for example, a printer, a cathode ray tube (CRT) display, a liquid crystal diode (LCD) display, a plasma display panel (PDP) display, an organic light-emitting diode (OLED) display, a field effect diode (FED) display, a light-emitting diode (LED) display, a digital light processing (DLP) display, a primary flight display (PFD), a three-dimensional (3D) display, a transparent display, or the like. Also, the display unit 140 may be implemented in a form capable of displaying and inputting information, such as a touch screen capable of receiving an input from a user. When the display unit 140 has a form capable of receiving an input, such as a touch screen, information input by a user may be transmitted to the determination controller 130, and the determination controller 130 may change various settings to reflect the input information.

The determination controller 130 may control the display unit 140 to display both of the detected position information and reference position information, and a user may compare the detected position information and the reference position information displayed together to determine whether the radiation irradiator 110 and the image acquisition unit 120 are repositioned at a position at the time of previous imaging, that is, a position corresponding to the reference position information. Since a rotation angle in the orbital rotation direction R1 and a rotation angle in the axial rotation direction R2 of the C arm 210, a position of the back and forth movement arm 220, and a position of the lift column 230 according to each piece of the detected position information and the reference position information are displayed on the display unit 140, a user can easily identify a difference between the reference position information and a detected position, and if necessary, may adjust positions of the C arm 210 in two rotation directions, a position of the back and forth movement arm 220, and a position of the lift column 230 such that actual position information matches the reference position information.

Image data, and radiation output information and reference position information are associated with each other and stored in the storage unit 150. That is, the determination controller 130 associates the image data with the radiation output information and the reference position information associated with the image data and stores the image data, the radiation output information, and the reference position information in the storage unit 150. Meanwhile, the radiation output information may also include information about whether to execute automatic brightness adjustment. In addition, setting values related to a direction and image processing of an X-ray image displayed through the display unit 140 or a screen display device such as a monitor may be associated with the reference position information or the image data and stored in the storage unit 150. When the direction of the X-ray image is required to be adjusted as necessary, an adjusted direction of a radiographic image may also be stored in the storage unit 150. Examples of the direction of the X-ray image include alignment of the X-ray image, a rotation angle of the X-ray image, and inversion of an image.

Elements related to image processing, setting values for a contrast ratio, a brightness ratio, metal detection on/off, motion on/off, and the like, may also be associated with the reference position information or the image data and stored in the storage unit 150. In addition, a profile value may also be stored in association with the reference position information or the image data, and examples of the profile value may include a recursive filter factor, a pixel stretch, gamma, a lookup table (LUT), unsharp masking, a noise reduction filter, a camera setting, a detector T setting, an X-ray mode, and the like. In addition to those, other settings for X-ray imaging may be stored in association with the reference position information or the image data.

Figure 4:
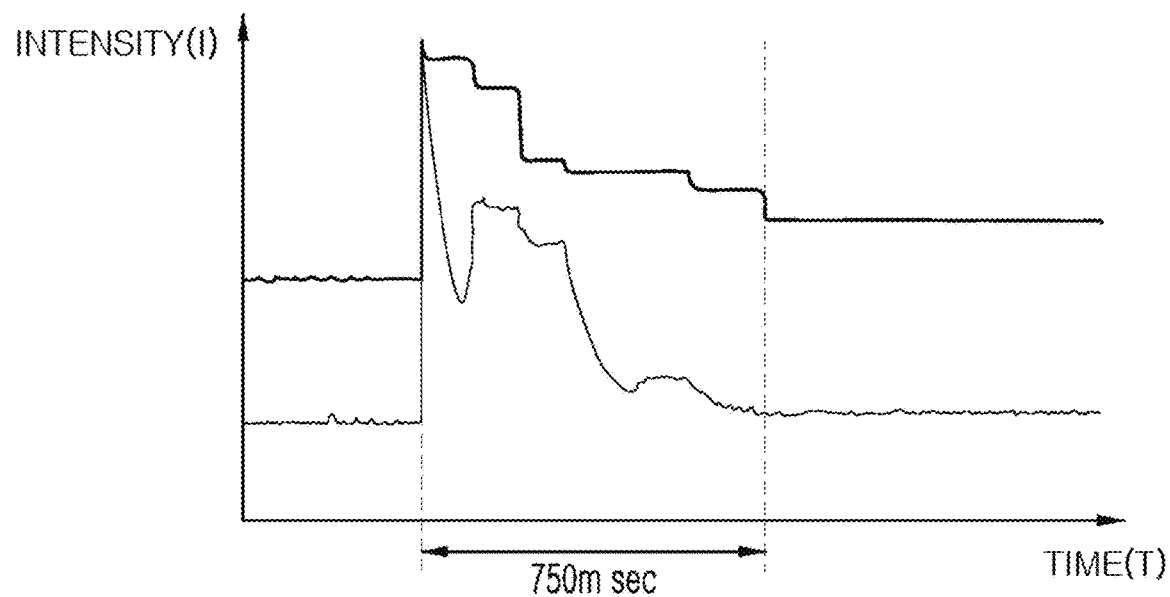
FIG. 4 is a schematic graph showing output power of radiation until brightness adjustment is performed in the radiographic device according to a related art.
Figure 5:
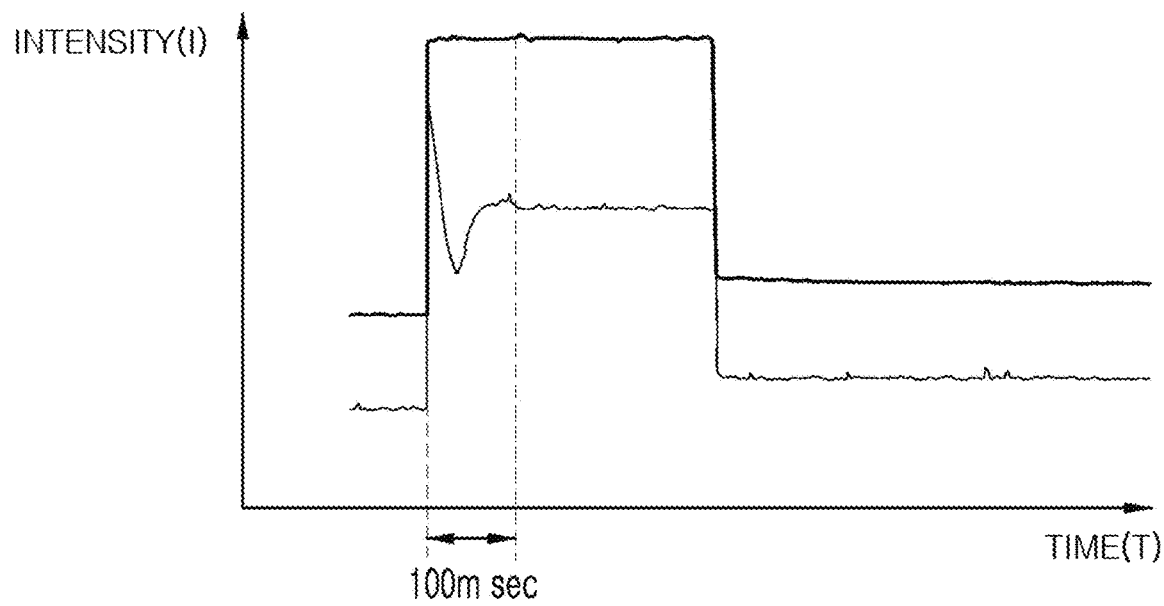
FIG. 5 is a schematic graph showing output power of radiation until brightness adjustment is performed in the radiographic device according to an embodiment of the present invention.

FIG. 4 is a schematic graph showing an output voltage and an output current of radiation until automatic brightness adjustment is completed in a radiographic device according to a related art. FIG. 5 is a schematic graph showing an output voltage and an output current of radiation until automatic brightness adjustment is completed in the radiographic device according to the embodiment of the present invention. In the graphs of FIGS. 4 and 5, a graph line drawn as a bold line represents the output voltage, and a graph line drawn as a fine line represents the output current.

Referring to FIG. 4, in the radiographic device according to the related art, it takes about 750 msec until automatic brightness adjustment is completed in a state in which a radiation irradiator and an image acquisition unit are repositioned for re-imaging, and the output voltage and the output current are adjusted through 4 to 6 stages. On the other hand, referring to FIG. 5, in the radiographic device according to the embodiment of the present invention, it takes about 100 msec until automatic brightness adjustment is completed in a state in which the radiation irradiator 110 and the image acquisition unit 120 are repositioned for re-imaging, and the adjustment of the output voltage and the output current is completed within one or two stages, and thus it can be seen that the automatic brightness adjustment is performed faster as compared with the related art.

According to the related art, an X-ray irradiation time for brightness adjustment is about 750 msec, but when X-rays are re-radiated at the same position, brightness adjustment starts according to a prestored X-ray output condition, and thus a time taken for brightness adjustment is reduced as compared with a previous method. Since there is almost no difference between a starting point of automatic brightness adjustment and an optimal value of automatic brightness, a time taken for automatic brightness adjustment is reduced to less than 100 msec. Thus, an exposure dose to a patient and a user is reduced, and an X-ray image is displayed more quickly on the display unit 140, which assists in shortening an operation time.

As described above, in the radiographic device according to the present invention, automatic brightness exposure control is used, position information of the C arm 210, that is, a rotation angle in the orbital rotation direction R1 and a rotation angle in the axial rotation direction R2, a position of the back and forth movement arm 220, and a position of the lift column 230, is stored in the storage unit 150, and when a rotation angle in the orbital rotation direction R1 and a rotation angle in the axial rotation direction R2 of the C arm 210, a position of the back and forth movement arm 220, and a position of the lift column 230, which are detected by the position information detector 160, match position information stored in the storage unit 150, automatic brightness exposure control and imaging are performed according to a stored radiation output condition. Therefore, when a radiographic image is acquired again at the same position, an irradiation time for automatic brightness adjustment is shortened, thereby reducing an exposure dose to a patient and a user.

Figure 6:
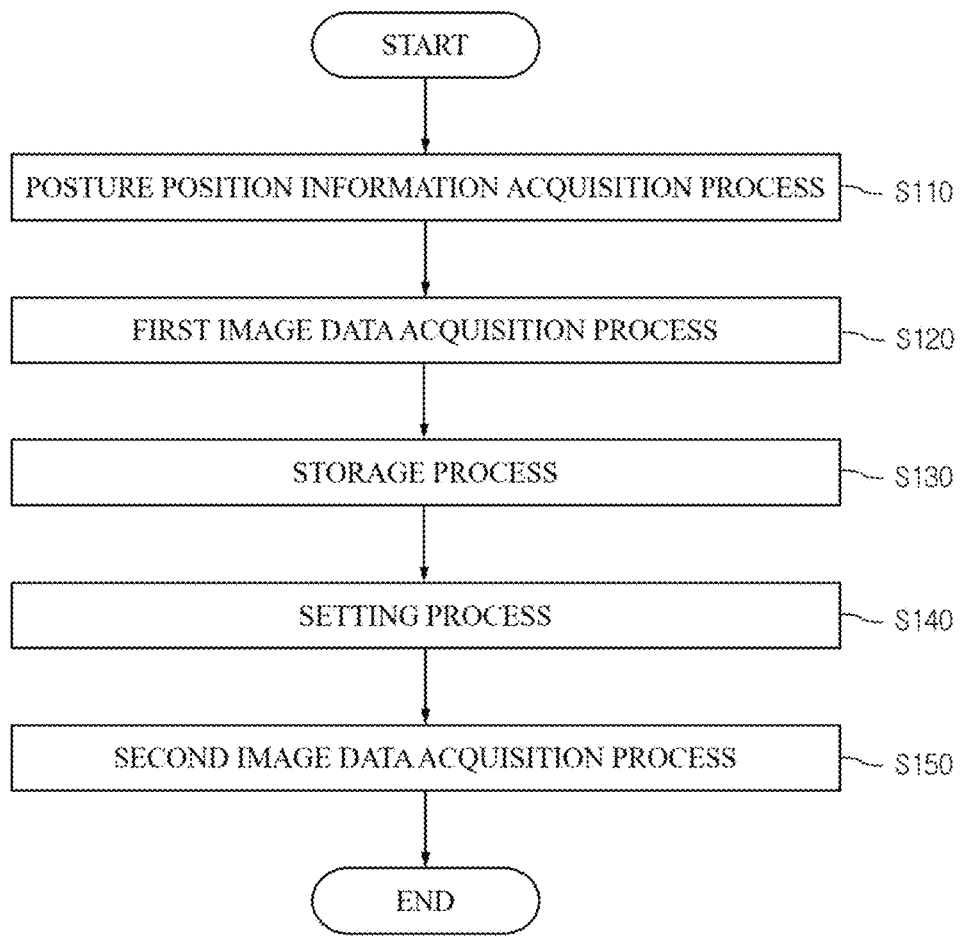
FIG. 6 is a schematic flowchart illustrating a radiographic method using a radiographic device according to an embodiment of the present invention.

Next, a radiographic method that may be performed using the radiographic device according to the embodiment of the present invention described above will be described. FIG. 6 is a schematic flowchart illustrating a radiographic method according to an embodiment of the present invention.

Referring to FIG. 6, the radiographic method according to the embodiment of the present invention includes the position information acquisition process S110 of acquiring position information of the radiation irradiator 100 or the image acquisition unit 120, the image data acquisition process S121 of radiating, by the radiation irradiator 110, radiation onto an irradiation target object and acquiring, by the image acquisition unit 120, image data, the storage process S130 of mutually associating the acquired image data with reference position information and radiation output information related to the acquired image data and storing the acquired image data, the reference position information, and the radiation output information, and the setting process S140 of, when position information measured by the position information detector 160 matches the reference position information, setting a radiation output condition of the radiation irradiator 110 according to the radiation output information associated with the reference position information. Here, the reference position information may be position information that is measured when image data is acquired and is associated with the acquired image data. The radiographic method according to the embodiment of the present invention may further include the image data acquisition process S122 of acquiring a radiation output condition according to an input from a user or prestored radiation output information to acquire image data.

First, in the position information acquisition process S110, as described above, the position information of the radiation irradiator 110 or the image acquisition unit 120 may be acquired by measuring a position change and a state change of a support supporting the radiation irradiator 110 and the image acquisition unit 120. That is, position information of the C arm 210, the back and forth movement arm 220, and the lift column 230 may be acquired through values measured through a rotation angle sensor, a displacement sensor, and the like.

The image data acquisition process may be performed twice. The image data acquisition process performed after the position information acquisition process S110 is referred to as the first image data acquisition process S121, and an image data acquisition process after the setting process S140 to be described below is referred to as the second image data acquisition process S122.

In the first image data acquisition process S121, the radiation irradiator 110 radiates radiation onto the irradiation target object, and the image acquisition unit 120 acquires image data. The image data acquired in such a process may be transmitted to the determination controller 130.

The image data acquired in the storage process S130, position information related to the acquired image data, that is, the reference position information, and the radiation output information are associated with each other and stored. As described above, the determination controller 130 mutually associates the acquired image data with the reference position information and the radiation output information related to the acquired image and stores the acquired image data, the reference position information, and the radiation output information in the storage unit 150. Meanwhile, after the storage process S130, positions of the radiation irradiator 110 and the image acquisition unit 120 may be changed for radiography at another position, and the above-described position information acquisition process S110, first Image data acquisition process S121, and storage process S130 may be performed at the changed positions. Accordingly, a plurality of data sets of the image data, the reference position information, and the radiation output information associated with each other may be stored.

In the setting process S140, when the position information measured by the position information detector 160 matches the reference position information, the radiation output condition of the radiation irradiator 110 is set according to the radiation output information associated with the reference position information. Here, at least one of the measured position, the image data, the reference position information, and the radiation output information may be displayed on the display unit 140 to be confirmed by a user. Instead of or in addition to such a process, a process of acquiring the radiation output condition according to an input of the user or radiation output information prestored in the storage unit 150 may be performed.

The radiation output condition of the radiation irradiator 110, for example, an output voltage and an output current, is set according to a previously acquired radiation output condition, that is, a radiation output condition when previous image data is acquired at a measured current position.

The second image data acquisition process S122 is a process in which re-imaging is performed at the same position as the position of the radiation irradiator 110 and the image acquisition unit 120 at which the first image data acquisition process S121 was performed, the radiation irradiator 10 radiates radiation onto the radiation target object, and thus the image acquisition unit 120 acquires image data. In the second image data acquisition process S122, since the radiation output condition of the radiation irradiator 110, for example, the output voltage and the output current, is set according to a previously performed condition in the storage unit 150, that is, a radiation output condition when previous image data is acquired at a current position, automatic brightness adjustment through adjustment of the output voltage and the output current can be completed relatively quickly.

As described above, the position information of the C arm 210, for example, the rotation angle in the orbital rotation direction R1 and the rotation angle in the axial rotation direction R2, the position displacement of the back and forth movement arm 220, the position displacement of the lift column 230, and the radiation output information associated therewith, may be stored in the storage unit 150, and when measured position information matches the stored position information, automatic brightness control and image acquisition are performed according to a radiation output condition according to the radiation output information stored in the storage unit 150. Thus, when an image is acquired again at the same position, an irradiation time for automatic brightness adjustment is shortened, thereby reducing an exposure dose to a patient and a user.

The processes S110, S121, S130, S140, and S122 described above do not have to be performed in the order described above and may be performed in a changed order if necessary. In addition, each process may be repeatedly performed.

As described above, according to the radiographic device and the radiographic method using the same according to the embodiment of the present invention, radiation output information of radiography performed at an arbitrary position is stored, and when re-imaging is performed at a corresponding position, a radiation output condition is automatically set according to the stored radiation output information, and thus automatic brightness exposure control and imaging are performed. Accordingly, when an image is acquired again at the same position, an irradiation time for automatic brightness control is shortened, thereby reducing an exposure dose to a patient and a user. In addition, since there is almost no difference between a starting point of automatic brightness adjustment and an optimal value of automatic brightness, a time taken for automatic brightness adjustment is reduced to less than 100 msec. Thus, an exposure dose to a patient and a user is reduced, and an X-ray image is displayed more quickly on the display unit 140, thereby considerably reducing a procedure time when a surgical procedure such as surgery is performed.

Hereinafter, an example in which the radiographic device according to the embodiment of the present invention is implemented as an X-ray imaging device will be described. In an example described below, the radiation irradiator 110 radiates X-rays for capturing an image and is referred to as an X-ray irradiator, and the image acquisition unit 120 includes an X-ray detector that detects X-rays penetrating an irradiation target object.

The determination controller 130 may control positions of the X-ray irradiator 110 and the image acquisition unit 120, an imaging timing, and an imaging condition according to an imaging condition set by a user, an input imaging condition, or a prestored manual. The determination controller 130 may control the X-ray irradiator 110 and the image acquisition unit 120 according to an input command to control X-ray exposure, image capturing, driving of the C arm 210, an irradiation timing, X-ray intensity, an X-ray irradiation area, and the like. In addition, the determination controller 130 may generate an image, a video, or a 3D image of the irradiation target object using image data received from the image acquisition unit 120 through X-ray imaging and may serve to receive image data from the image acquisition unit 120, remove image noise, and adjust a dynamic range, interleaving, or the like, thereby generating an image. An output unit for displaying the generated image may be provided and may output information such as user information or information about the irradiation target object which is necessary for a user to operate a user interface (UI) or an imaging device.

The determination controller 130 may include an X-ray exposure control module, a position change comparison module, a position exposure value combining module, and an automatic brightness adjustment module. The X-ray exposure control module controls exposure parameters (kV, mA, and the like) of X-rays radiated through the X-ray irradiator 110. The X-ray exposure parameters may include a tube voltage (kV), a tube current (mA), X-ray power (kW), an irradiation distance, an irradiation time, a focal size (mm), a rotation time (seconds), a loading time, and the like. The determination controller 130 controls the X-ray irradiator, a generator, or the like to radiate X-rays according to the set X-ray exposure parameters and serves to perform control such that X-rays are radiated according to an imaging mode manual stored in the storage unit.

The X-ray exposure control module may be configured to perform an automatic exposure control (AEC) function. The AEC function is a function of limiting output power of X-rays at a time point at which radiated X-rays penetrate the irradiation target object and an appropriate exposure is obtained and is a function of always adjusting an appropriate X-ray condition when the absorption of X-rays is different due to a thickness of the irradiation target object. Usually, X-ray radiation is stopped at a moment when a target reference value is reached according to preset reference values such as an X-ray dose radiation time and a luminance value of a captured video image.

For example, in order to capture an image during a spine procedure, positioning of driving units for driving the C arm 210 should be performed. For example, a thickness direction position (AP position) of the irradiation target object, a diagonal direction position (Obl position) of the irradiation target object, and a width direction position (LAT position) of the irradiation target object may be shifted several times to capture an image and perform a surgical procedure. Here, the driving of the C arm 210 may be performed through a manual driving method by a user's manipulation or through an automatic driving method which is a motorized method.

In a state in which the C arm 210 is driven and positioned at the AP position, that is, a first position, an X-ray image may be captured. When the captured image is stored, data such as position information of the driving units for driving the C arm 210, that is, rotation angle information, movement distance information, and other information (direction information of an image displayed on the display, collimator position information of the X-ray irradiator, image processing related information, and the like), and an X-ray output condition at the AP position, that is, X-ray exposure parameter information are combined with a corresponding image and stored as first positioning image data in the storage unit 150 by the position exposure combining module.

After the first positioning image data is stored, a position of the C arm 210 is changed for a surgical procedure to continuously capture an image, and in this case, when the position change comparison module determines that position information detected by the position information detector 160 matches position information of the first positioning image data (or position information of any one piece of image data among positioning image data prestored in the storage unit 150 including the first positioning image data), that is, reference position information, the X-ray exposure control module reads the X-ray exposure parameter information stored in the first positioning image data and controls the X-ray irradiator 110 to radiate the same X-rays.

Then, a user may capture a plurality of images at various surgical procedure positions, and corresponding positioning image data may be stored. While a position is shifted to capture an image for an ongoing surgical procedure and surgery, when a current angle, moving distance, and the like of the driving unit for driving the C arm 210 detected by the position information detector 160 are the same as those of any one of a plurality of pieces of positioning image data stored in the storage unit 150, the determination controller 130 directly reads the X-ray exposure parameter information of the corresponding positioning image data and performs control such that the same X-rays are radiated. Thus, when the C arm returns to the stored position, the X-ray exposure control module of the determination controller 130 directly reads only an X-ray exposure value of a corresponding X-ray parameter from the positioning image data including the same position information among the positioning image data prestored in the storage unit 150 and performs control such that the same X-rays are radiated.

When such a surgical procedure is performed through an existing method, an automatic brightness control (ABC) function is activated when X-ray image capturing is conducted at various treatment positions, and a time taken for the ABC function to be loaded is several seconds or more. Thus, since a patient and a user are exposed to X-rays during a long-term surgical procedure and surgery, there is a problem that a cumulative exposure dose increases. However, in the present invention, when the C arm returns to the same position during a surgical procedure, an X-ray exposure value may be directly read from the prestored positioning image data to radiate the same X-rays and minimize an ABC loading time, thereby minimizing additional radiation exposure.

A C arm type X-ray imaging device is equipped with an ABC function, and the ABC function is a function that enables it to automatically control an X-ray dose in real time during image capturing and a function of approximately estimating an appropriate fluoroscopic X-ray dose to control an X-ray dose through a method of controlling X-ray conditions (X-ray exposure parameters) with reference to, when X-rays are radiated onto a patient, an amount of X-ray signals detected by a photosensor provided in the image acquisition unit 120.

For reference, in the C arm type X-ray imaging device, it takes several seconds or more (loading time) until ABC control is completed after being started when image capturing is conducted at each position. In the present invention, when imaging is conducted at each image capturing position, since X-rays can be controlled to be directly radiated without an ABC loading time, it is possible to prevent additional radiation exposure due to X-rays generated until loading is completed, thereby minimizing a cumulative exposure dose to a patient and a user.

Meanwhile, according to another embodiment of the present invention, only position information may be separately stored without image information during imaging. That is, a function may be provided to separately store only a position without an image while images are captured at various positions during a surgical procedure or surgery. Excluding image information, position information of the driving units for driving the C arm and X-ray parameter information may be combined and stored in the storage unit, and when the C arm returns to the same position, X-rays may be controlled to be radiated with the same X-ray exposure value. In addition, position information about each position stored in this way and X-ray exposure values stored in association with each other may be displayed on the display unit at the same time.

Figure 7:
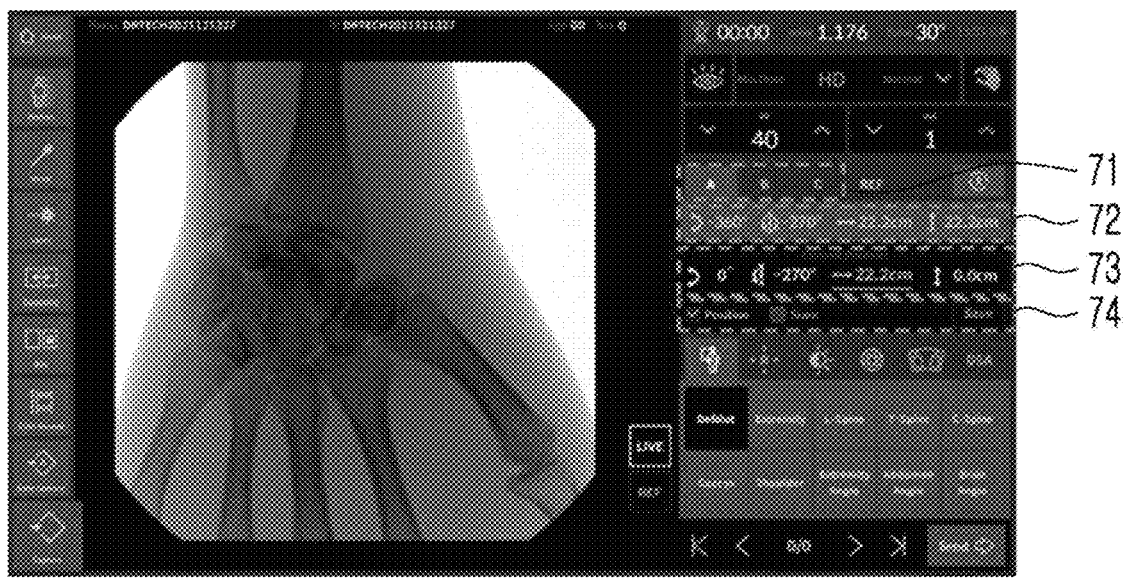
FIG. 7 is a graph showing an example of a state in which reference position information displayed on a display unit of the radiographic device and real-time position information detected by a position information detector are displayed.

Meanwhile, FIG. 7 shows an example in which reference position information and real-time position information detected by the position information detector 160 are displayed on the display unit 140 of the radiographic device according to an embodiment of the present invention. Tabs indicating a plurality of pieces of stored reference position information, that is, tabs A, B, and C, are displayed in a tab display area 71. In FIG. 7, tab A is selected among tabs indicating three pieces of reference position information, and reference position information stored in tab A is displayed in a reference position information display area 72. In the reference position information display area 72, a rotation angle (−360 degrees) in the orbital rotation direction, a rotation angle in the axial rotation direction (−270 degrees), lateral position displacement (22.2 cm), and vertical position displacement (0.0 cm) of the C arm 210 are shown as an example. Position information of the C arm 210 detected by the position information detector 160 is displayed in a detection position information display area 173, and in this case, a case in which horizontal position displacement of the detected position information matches a corresponding value of reference position information is shown. In this case, that is, when the detected position information matches the reference position information, the X-ray irradiator 110 may be controlled according to X-ray output information associated with the reference position information. In this case, when one or more of a plurality of position values constituting the reference position information match a corresponding value of the detected position information, the matching position value may be displayed to be identified. Accordingly, a user can easily compare the detected position information with the stored reference position information. A command for storing currently detected position information as reference position information is received through a reference position information storage area 174. For example, as shown in the drawing, each of a position item Position indicating a position and a state item State indicating X-ray output information may be selected, and in this state, a storage item Save may be selected to allow the selected position item Position and/or state item State to be stored as reference information in a corresponding reference position information tab. Accordingly, a position desired by a user and X-ray output information performed at the corresponding position may be selected as reference information. What is shown in FIG. 7 may be implemented by a touch screen capable of receiving a user's manipulation command.

While the embodiments of the present invention have been described above, the scope of the present invention is not limited thereto, and various modifications and improved aspects made by those skilled in the art utilizing the basic concept of the present invention that are defined in the following claims also belong to the scope of the present invention.

DESCRIPTIONS OF REFERENCE NUMERALS

110: radiation irradiator
120: image acquisition unit
130: determination controller
140: display unit
150: storage unit
160: position information detector
200: support
210: C arm
220 back and forth movement arm
230: lift column
240: support body
S: irradiation target object

The invention claimed is:
1. A radiographic device comprising:
a radiation irradiator radiating radiation;
an image acquisition unit acquiring an image by receiving the radiation which is radiated from the radiation irradiator and passes through an irradiation target object;
a support member supporting the radiation irradiator and the image acquisition unit;
a driving unit driving the support member;

a position information detector detecting position information indicating a position of at least one of the radiation irradiator and the image acquisition unit;

a storage unit associating reference position information indicating the position of the at least one of the radiation irradiator and the image acquisition unit and corresponding radiation output information of the radiation irradiator and storing the associated information as positioning information; and a determination controller, when the position information detected by the position information detector matches the reference position information of the positioning information, controlling the radiation irradiator to operate and radiate radiation according to the radiation output information of the corresponding positioning information, wherein the positioning information further includes a radiographic image acquired at a position of the reference position information.

2. The radiographic device of claim 1, wherein the reference position information corresponds to a position at which radiography is performed by the radiation irradiator and the image acquisition unit, and the radiation output information includes a radiation output condition for driving the radiation irradiator to perform the radiography performed at the position of the reference position information.

3. The radiographic device of claim 2, wherein the positioning information includes a plurality of pieces of positioning information corresponding to a plurality of positions.

4. The radiographic device of claim 1, further comprising a display unit displaying the positioning information, wherein the display unit displays the reference position information and the position information detected by the position information detector.

5. The radiographic device of claim 1, wherein the reference position information and the position information detected by the position information detector include information indicating a position of the driving unit.

6. The radiographic device of claim 5, wherein the support member is a C arm having both end portions on which the radiation irradiator and the image acquisition unit are fixed, and the driving unit drives the C arm to perform linear movement in one or more directions and rotational movement in one or more directions.

7. The radiographic device of claim 1, wherein the radiation irradiator is an X-ray irradiator radiating X-rays, and the radiation output information includes at least one of an output voltage, an output current, X-ray power, an irradiation distance, an irradiation time, a focal size, a rotation time, and a loading time for driving the X-ray irradiator.

8. The radiographic device of claim 1, wherein the positioning information further includes at least one of direction information of an X-ray image, position information of a collimator of the X-ray irradiator, and image processing information.

9. A radiographic device comprising:

an X-ray irradiator radiating X-rays;

an image acquisition unit acquiring an image by receiving the X-rays which are radiated from the radiation irradiator and pass through an irradiation target object;

a C arm supporting the X-ray irradiator and the image acquisition unit;

a driving unit driving the C arm;

a position information detector detecting position information of at least one of driving elements of the driving unit of the C arm;

a storage unit setting position information in which an image is captured by the X-ray irradiator and the image acquisition unit as reference position information, associating the reference position information and X-ray output information in which the image is captured, and storing the associated information as positioning information; and a determination controller controlling an operation of the X-ray radiator based on the position information detected by the position information detector, wherein the determination controller performs an operation of associating the X-ray output information for driving the X-ray irradiator to capture the image when the image is captured by the X-ray irradiator and the image acquisition unit and the reference position information indicating a position at which the image is captured and storing the associated information as the positioning information, and an operation of, when the position information of the driving element detected by the position information detector matches any one piece of reference position information of the positioning information, controlling the X-ray irradiator to be driven under an X-ray output condition according to the X-ray output information associated with the reference position information so that the image is captured, wherein the positioning information further includes a radiographic image acquired at a position of the reference position information.

10. The radiographic device of claim 9, wherein the positioning information further includes an X-ray image acquired with the reference position information and the X-ray output information associated therewith.

11. The radiographic device of claim 9, further comprising a display unit displaying information, wherein the display unit displays both of the reference position information and the position information detected by the position information detector.

12. The radiographic device of claim 11, wherein the display unit includes a reference position information display area in which the reference position information is displayed, a detection position information display area in which the position information detected by the position information detector is displayed, and a reference position information storage area through which a command for storing the detected position information as the reference position information is received.

13. The radiographic device of claim 12, wherein the display unit identifiably displays a value matching a position value of the reference position information among position values of the detected position information.

14. A radiographic method, which is performed using a radiographic device including a radiation irradiator radiating radiation, and an image acquisition unit acquiring an image by receiving the radiation which is radiated from the radiation irradiator and penetrates an irradiation target object, the radiographic method comprising:

associating reference position information indicating a position of the radiation irradiator during radiography and radiation output information including a driving condition of the radiation irradiator with each other and storing the associated information in a storage unit as positioning information;

determining whether position information indicating a position of the radiation irradiator detected in real time matches any one piece of reference position information in the positioning information stored in the storage unit; and when the detected position information matches the reference position information in the positioning information, controlling the radiation irradiator to be driven according to the radiation output information associated with the reference position information so that an image is captured, wherein the positioning information further includes a radiographic image captured according to the radiation output information at a reference position.

15. The radiographic method of claim 14, further comprising displaying both of the reference position information and the detected position information of the positioning information on a display unit.

* * * * *